United States Patent
Hayashi

(10) Patent No.: US 6,862,484 B2
(45) Date of Patent: Mar. 1, 2005

(54) CONTROLLING METHOD FOR MANUFACTURING PROCESS

(75) Inventor: Shunji Hayashi, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/125,403

(22) Filed: Apr. 19, 2002

(65) Prior Publication Data

US 2002/0156549 A1 Oct. 24, 2002

(30) Foreign Application Priority Data

Apr. 20, 2001 (JP) ........................................ 2001-122621

(51) Int. Cl.⁷ .............................................. G05B 21/02
(52) U.S. Cl. ........................ 700/73; 700/110; 700/121; 702/83; 702/84; 702/185
(58) Field of Search ............................ 700/73, 79, 110, 700/121; 702/183, 185, 81–84

(56) References Cited

U.S. PATENT DOCUMENTS

| | | | |
|---|---|---|---|
| 5,392,364 A | * | 2/1995 | Yokoyama et al. ......... 382/190 |
| 5,446,681 A | | 8/1995 | Gethner et al. |
| 5,544,256 A | | 8/1996 | Brecher et al. |
| 5,586,066 A | | 12/1996 | White et al. |
| 5,590,036 A | | 12/1996 | Maeda |
| 5,602,938 A | | 2/1997 | Akiyama et al. |
| 5,726,905 A | | 3/1998 | Yazici et al. |
| 5,742,522 A | | 4/1998 | Yazici et al. |
| 5,751,898 A | | 5/1998 | Kosaka et al. |
| 5,835,902 A | | 11/1998 | Jannarone |
| 6,012,019 A | | 1/2000 | Saby |
| 6,117,601 A | * | 9/2000 | Kanazawa et al. ............ 430/30 |
| 6,272,233 B1 | | 8/2001 | Takeo |
| 6,438,440 B1 | * | 8/2002 | Hayashi ...................... 700/121 |
| 6,603,867 B1 | * | 8/2003 | Sugino et al. .............. 382/115 |
| 6,665,576 B2 | * | 12/2003 | Hayashi ...................... 700/121 |
| 2002/0188367 A1 | * | 12/2002 | Hayashi ...................... 700/110 |

FOREIGN PATENT DOCUMENTS

| | | | | | |
|---|---|---|---|---|---|
| JP | 09305768 A | * | 11/1997 | ............. | G06T/7/00 |
| JP | 10124766 A | * | 5/1998 | ........... | G08B/17/00 |
| JP | 2000-114130 | | 4/2000 | ........... | H01L/21/02 |
| JP | 2000275757 A | * | 10/2000 | ........... | G03B/42/02 |
| JP | 2001223885 A | * | 8/2001 | .......... | H04N/1/387 |

OTHER PUBLICATIONS

EP Pub. No. 1014191 A2 to Kanazawa et al.*

* cited by examiner

*Primary Examiner*—Anthony Knight
*Assistant Examiner*—Crystal J Barnes
(74) *Attorney, Agent, or Firm*—Volentine Francos & Whitt, PLLC

(57) ABSTRACT

In a method of controlling a manufacturing process, a Mahalanobis space of plural manufacturing control parameters is generated on the basis of first sampled data. Then, a Mahalanobis distance from the Mahalanobis space and second sampled data is calculated. A manufacturing process is determined to be under a malfunction operating condition by comparing the Mahalanobis distance and a threshold value.

10 Claims, 14 Drawing Sheets

Fig. 2

| No | 1st. WIP | ... | 4th. FF | ... | THROUGHPUT | $Y_1$ | ... | $Y_k$ | ... | $Y_p$ |
|---|---|---|---|---|---|---|---|---|---|---|
| 1 | 132 | ... | 4.2 | ... | 26 | $y^t_{1,1}$ | ... | $y^t_{k,1}$ | ... | $y^t_{p,1}$ |
| 2 | 118 | ... | 3.7 | ... | 31 | $y^t_{1,2}$ | ... | $y^t_{k,2}$ | ... | $y^t_{p,2}$ |
| 3 | 129 | ... | 5.2 | ... | 29 | $y^t_{1,3}$ | ... | $y^t_{k,3}$ | ... | $y^t_{p,3}$ |
| .. | .. | .. | .. | .. | .. | .. | .. | .. | .. | .. |
| .. | .. | .. | .. | .. | .. | .. | .. | .. | $y^t_{i,j}$ | .. |
| .. | .. | .. | .. | .. | .. | .. | .. | .. | .. | .. |
| n | 112 | ... | 4.6 | ... | 28 | $y^t_{1,n}$ | ... | $y^t_{k,n}$ | ... | $y^t_{p,n}$ |

Fig. 3

| No | $Y_1$ | ... | $Y_k$ | ... | $Y_p$ |
|---|---|---|---|---|---|
| 1 | $y'_1 \cdot _1$ | ... | $y'_k \cdot _1$ | ... | $y'_p \cdot _1$ |
| 2 | $y'_1 \cdot _2$ | ... | $y'_k \cdot _2$ | ... | $y'_p \cdot _2$ |
| 3 | $y'_1 \cdot _3$ | ... | $y'_k \cdot _3$ | ... | $y'_p \cdot _3$ |
| : | : | : | : | : | : |
| : | : | : | : | $y'_i \cdot _j$ | : |
| : | : | : | : | : | : |
| n | $y'_1 \cdot _n$ | ... | $y'_k \cdot _n$ | ... | $y'_p \cdot _n$ |
| m | $m_1$ | ... | $m_k$ | ... | $y'_p$ |
| $\sigma$ | $\sigma_1$ | ... | $\sigma_k$ | ... | $\sigma_p$ |

Fig. 4

| $Y_1$ | ... | $Y_k$ | ... | $Y_p$ |
|---|---|---|---|---|
| $y_1 \cdot _1$ | ... | $y_k \cdot _1$ | ... | $y_p \cdot _1$ |
| $y_1 \cdot _2$ | ... | $y_k \cdot _2$ | ... | $y_p \cdot _2$ |
| $y_1 \cdot _3$ | ... | $y_k \cdot _3$ | ... | $y_p \cdot _3$ |
| : | : | : | : | : |
| : | : | : | $y_i \cdot _j$ | : |
| : | : | : | : | : |
| $y_1 \cdot _n$ | ... | $y_k \cdot _n$ | ... | $y_p \cdot _n$ |

Fig. 5

$$R = \begin{bmatrix} 1 & r_1{}^*{}_2 & \cdot & \cdot & \cdot & r_1{}^*{}_p \\ r_2{}^*{}_1 & 1 & \cdot & \cdot & \cdot & r_2{}^*{}_p \\ \cdot & \cdot & \cdot & \cdot & \cdot & \cdot \\ \cdot & \cdot & \cdot & r_i{}^*{}_j & \cdot & \cdot \\ \cdot & \cdot & \cdot & \cdot & \cdot & \cdot \\ r_p{}^*{}_1 & r_p{}^*{}_2 & \cdot & \cdot & \cdot & 1 \end{bmatrix}$$

CORRELATION MATRIX 「R」 (i, j = 1 ~ P)

Fig. 6

$$r_i{}^*{}_j = r_j{}^*{}_i = \frac{1}{n} \sum_{k=1}^{n} y_i{}^*{}_k \cdot y_j{}^*{}_k \quad \cdots (2)$$

Fig. 7

$$A = R^{-1} = \begin{bmatrix} a_1{}^*{}_1 & a_1{}^*{}_2 & \cdot & \cdot & \cdot & a_1{}^*{}_p \\ a_2{}^*{}_1 & a_2{}^*{}_2 & \cdot & \cdot & \cdot & a_2{}^*{}_p \\ \cdot & \cdot & \cdot & \cdot & \cdot & \cdot \\ \cdot & \cdot & \cdot & a_i{}^*{}_j & \cdot & \cdot \\ \cdot & \cdot & \cdot & \cdot & \cdot & \cdot \\ a_p{}^*{}_1 & a_p{}^*{}_2 & \cdot & \cdot & \cdot & a_p{}^*{}_p \end{bmatrix}$$

INVERSE MATRIX 「A」 (i, j = 1 ~ P)

Fig. 8

$$D^2 = \frac{1}{P} \sum_{k=1}^{P} \sum_{j=1}^{P} a_{ij} \cdot y_i y_j \quad \cdots(3)$$

MAHALANOBIS DISTANCE $D^2$

Fig. 9

|              | $Y_1$ | ... | $Y_k$ | ... | $Y_p$ |
|--------------|-------|-----|-------|-----|-------|
| 1 DEAL VALVE | $I_1$ | ... | $I_k$ | ... | $I_p$ |
| MAX. VALVE   | $U_1$ | ... | $U_k$ | ... | $U_p$ |
| MIN. VALVE   | $L_1$ | ... | $L_k$ | ... | $L_p$ |

Fig. 10

| No | Y1 | ... | Yk | ... | Yp |
|---|---|---|---|---|---|
| MIN~MAX | $L_1 \cdot U_1$ | ... | $L'_k \cdot U_1$ | ... | $L_p \sim U_p$ |
| 1 | $y'_1 \cdot _1$ | ... | $y'_k \cdot _1$ | ... | $y'_p \cdot _1$ |
| 2 | $y'_1 \cdot _2$ | ... | $y'_k \cdot _2$ | ... | $y'_p \cdot _2$ |
| 3 | $y'_1 \cdot _3$ | ... | $y'_k \cdot _3$ | ... | $y'_p \cdot _3$ |
| : | : | | : | : | : |
| : | : | | : | $y'_i \cdot _j$ | : |
| : | : | | : | : | : |
| n | $y'_1 \cdot _n$ | ... | $y'_k \cdot _n$ | ... | $y'_p \cdot _n$ |

| TIME | D² | Y1 | ... | Yk | ... | Yp |
|---|---|---|---|---|---|---|
| | NORMAL | $y'_1 \cdot _1$ | ... | $y_k \cdot _1$ | ... | $y_p \cdot _1$ |
| | NORMAL | $y'_1 \cdot _2$ | ... | $y_k \cdot _2$ | ... | $y_p \cdot _2$ |
| | NORMAL | $y'_1 \cdot _3$ | ... | $y_k \cdot _3$ | ... | $y_p \cdot _3$ |
| | NORMAL | : | : | : | : | : |
| | MALFUNCTION | 0.7 | : | 1.3 | : | -0.9 |
| | NORMAL | : | : | : | : | : |

| RANK | PARAMETER | B | \|B\| |
|---|---|---|---|
| 1 | $Y_{10}$ | 2.1 | 2.1 |
| 2 | $Y_3$ | -1.7 | 1.7 |
| : | : | : | : |
| 7 | $Y_k$ | -1.3 | 1.3 |
| : | : | : | : |
| 12 | $Y_p$ | -0.9 | 0.9 |
| 13 | $Y_1$ | 0.7 | 0.7 |

Fig. 13

| PARAMETER | $Y_1$ | $Y_2$ | $Y_3$ | $Y_4$ | $Y_5$ | ... | $Y_p$ | $D^2$ | $MD_{ab} - MD_j$ |
|---|---|---|---|---|---|---|---|---|---|
| Malfunction data | $y_1$ | $y_2$ | $y_3$ | $y_4$ | $y_5$ | ... | $y_p$ | $MD_{ab}$ | --- |
| Combi. 1 |  | $y_2$ | $y_3$ | $y_4$ | $y_5$ | ... | $y_p$ | $MD_1$ | $MD_{ab} - MD_1$ |
| Combi. 2 | $y_1$ |  | $y_3$ | $y_4$ | $y_5$ | ... | $y_p$ | $MD_2$ | $MD_{ab} - MD_2$ |
| Combi. 3 | $y_1$ | $y_2$ |  | $y_4$ | $y_5$ | ... | $y_p$ | $MD_3$ | $MD_{ab} - MD_3$ |
| Combi. 4 | $y_1$ | $y_2$ | $y_3$ |  | $y_5$ | ... | $y_p$ | $MD_4$ | $MD_{ab} - MD_4$ |
| Combi. 5 | $y_1$ | $y_2$ | $y_3$ | $y_4$ |  | ... | $y_p$ | $MD_5$ | $MD_{ab} - MD_5$ |
| .. | .. | .. | .. | .. | .. | ... | .. | .. | .. |
| Combi. P | $y_1$ | $y_2$ | $y_3$ | $y_4$ | $y_5$ | ... |  | $MD_p$ | $MD_{ab} - MD_p$ |

Fig. 14

| PARAMETER | $Y_1$ | $Y_2$ | $Y_3$ | $Y_4$ | $Y_5$ | ... | $Y_p$ | $D^2$ | $MD_{ab}-MD_j$ |
|---|---|---|---|---|---|---|---|---|---|
| Malfunction Data | $y_1$ | $y_2$ | $y_3$ | $y_4$ | $y_5$ | ... | $y_p$ | $MD_{ab}$ | --- |
| Combi. 1 | $m_1$ | $y_2$ | $y_3$ | $y_4$ | $y_5$ | ... | $y_x$ | $MD_1$ | $MD_{ab}-MD_1$ |
| Combi. 2 | $m_2$ | $m_2$ | $y_3$ | $y_4$ | $y_5$ | ... | $y_x$ | $MD_2$ | $MD_{ab}-MD_2$ |
| Combi. 3 | $m_3$ | $y_2$ | $m_3$ | $y_4$ | $y_5$ | ... | $y_x$ | $MD_3$ | $MD_{ab}-MD_3$ |
| Combi. 4 | $m_4$ | $y_2$ | $y_3$ | $m_4$ | $y_5$ | ... | $y_x$ | $MD_4$ | $MD_{ab}-MD_4$ |
| Combi. 5 | $y_1$ | $m_5$ | $m_5$ | $y_4$ | $y_5$ | ... | $y_x$ | $MD_5$ | $MD_{ab}-MD_5$ |
| Combi. 6 | $y_1$ | $m_6$ | $y_3$ | $m_6$ | $y_5$ | ... | $y_x$ | $MD_6$ | $MD_{ab}-MD_6$ |
| Combi. 7 | $y_1$ | $m_7$ | $y_3$ | $y_4$ | $m_7$ | ... | $y_x$ | $MD_7$ | $MD_{ab}-MD_7$ |
| Combi. 8 | $y_1$ | $y_2$ | $m_8$ | $m_8$ | $y_5$ | ... | $y_x$ | $MD_8$ | $MD_{ab}-MD_8$ |
| Combi. 9 | $y_1$ | $y_2$ | $m_9$ | $y_4$ | $m_9$ | ... | $y_x$ | $MD_9$ | $MD_{ab}-MD_9$ |
| Combi. 10 | $y_1$ | $y_2$ | $y_3$ | $m_{10}$ | $m_{10}$ | ... | $y_x$ | $MD_{10}$ | $MD_{ab}-MD_{10}$ |
| Combi. 11 | $y_1$ | $m_{11}$ | $y_3$ | $y_4$ | $y_5$ | ... | $m_x$ | $MD_{11}$ | $MD_{ab}-MD_{11}$ |
| .. | .. | .. | .. | .. | .. | ... | .. | .. | .. |
| Combi. P | $y_1$ | $y_2$ | $y_3$ | $y_4$ | $m_5$ | ... | $m_x$ | $MD_x$ | $MD_{ab}-MD_x$ |

Fig. 15

| PRIORITY | K=1 | K=2 | |
|---|---|---|---|
| 1 | $Y_8$ | $Y_8$ | $Y_8$ |
| 2 | $Y_2$ | $Y_8$ | $Y_{18}$ |
| 3 | $Y_{14}$ | $Y_2$ | $Y_{10}$ |
| : | : | : | |
| P | $Y_7$ | $Y_{12}$ | $Y_8$ |
| : | : | | |
| X | : | $Y_7$ | $Y_{11}$ |

Fig. 16

| SECTION | APPARATUS GROUP | | | | |
|---|---|---|---|---|---|
| Sect. 1 | A, | E, | G, | ... | |
| Sect. 2 | D, | T, | V, | ... | |
| Sect. 3 | B, | D, | T, | ... | |
| : | : | | | | |
| Sect. 13 | A, | T, | Z, | ... | |

| PROCESS | SECTION | MIN-WIP | TARGET-WIP | W | ACTUAL-WIP | POINT | LEVEL |
|---|---|---|---|---|---|---|---|
| Start | Sect. 1 | 53 | 58 | 1 | 52 | 1.1 | Level 1 |
| | Sect. 2 | 60 | 66 | 2 | 63 | 1.1 | Level 1 |
| | Sect. 3 | 75 | 82 | 3 | 74 | 3.5 | Level 2 |
| | Sect. 4 | 83 | 91 | 4 | 88 | 1.6 | Level 1 |
| | Sect. 5 | 54 | 59 | 5 | 57 | 2.1 | Level 1 |
| | Sect. 6 | 75 | 82 | 6 | 78 | 3.4 | Level 2 |
| | Sect. 7 | 69 | 76 | 7 | 69 | 7.0 | Level 3 |
| | Sect. 8 | 69 | 76 | 8 | 83 | -8.8 | Level 0 |
| | Sect. 9 | 83 | 91 | 9 | 84 | 7.5 | Level 4 |
| | Sect. 10 | 72 | 79 | 10 | 73 | 8.6 | Level 4 |
| | Sect. 11 | 62 | 68 | 11 | 61 | 13.3 | Level 5 |
| | Sect. 12 | 60 | 88 | 12 | 88 | -1.2 | Level 0 |
| End | Sect. 13 | 78 | 85 | 13 | 78 | 12.2 | Level 5 |

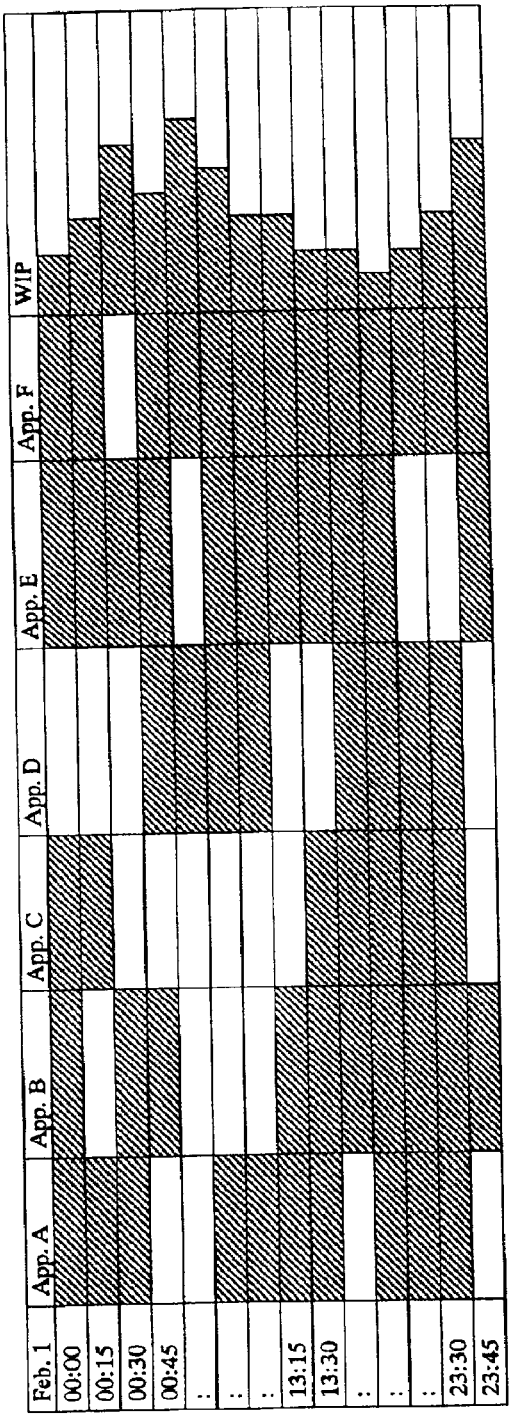
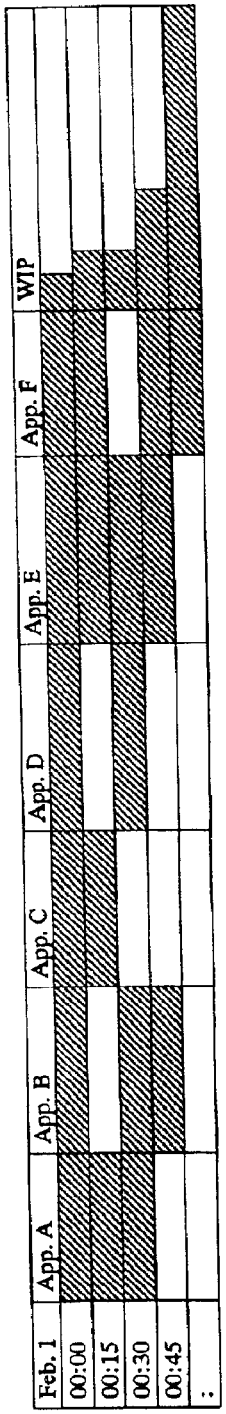
Fig. 20(a)
Fig. 20(b)

US 6,862,484 B2

CONTROLLING METHOD FOR MANUFACTURING PROCESS

BACKGROUND OF THE INVENTION

1. Field of the Invention

The present invention relates to a method of managing a manufacturing process, and more particularly to a managing method for a semiconductor manufacturing process including a wafer process (WP), a test process (TP) and an assembly process (AP).

The present application claims priority under 35 U.S.C. §119 to Japanese Patent Application No. 2001-122621, filed Apr. 20, 2001, which is herein incorporated by reference in its entirely for all purposes.

2. Description of the Related Art

As a conventional method for controlling a manufacturing process, an administrator, for example manager, assistant manager, or leader, controls various manufacturing parameters, judges conditions of the various manufacturing parameters, and then outputs instructions in accordance with the conditions. A controlling system is established such that a graph and a report in accordance with various process data are automatically outputted through a local area network (LAN).

Specific manufacturing parameters are described below.

1) Work-in-progress (WIP) for every section, when a manufacturing process has a plurality of sections.

2) WIP for every area, when the manufacturing process is divided into a plurality of areas.

3) Speed control for the sections or areas.

4) Performance control of the manufacturing process.

5) Condition research for various troubles and maintenance.

An inventor of this application proposed a managing method and managing system for a semiconductor manufacturing equipment using a Mahalanobis distance, published in 2000, and in Japanese Laid-Open Patent Publication: P2000-114130A, published on Apr. 21, 2000. Commonly assigned U.S. patent application Ser. No. 09/276804, filed on Mar. 26, 1999, and entitled "METHOD AND SYSTEM FOR MANAGING SEMICONDUCTOR MANUFACTURING EQUIPMENT", now U.S. Pat. No. 6,438,440, which is incorporated herein by reference in its entirety. The Mahalanobis distance is a representative one of macroscopic multidimensional space analysis (multivariate analysis). Examples of macroscopic multidimensional space analysis include, for example the Mahalanobis distance, a k-Nearest neighbor method, a Beyes decision boundary, a Discriminant analysis, a Ward method, an Euclidean distance, a Chessboard distance, a Furthest neighbor method, a Nearest neighbor method, a Centroid method, and an Average method.

However, in the conventional method for controlling a manufacturing process, since there are too many graphs and reports needing to be controlled, it is very difficult to make a judgement about timing of carrying-in, timing of carrying-out, and a throughput of product. And, it requires many man-hours to make a judgement about them. Since such a judgement fairly depends upon the administrator's know-how, a wide difference in judgement occurs corresponding to different administrators.

More further, there are too many manufacturing parameters and they undergo a lot of changes in accordance with an operating condition of a manufacturing apparatus, and the judgement and instruction of the administrator. Therefore, it is very difficult to logically define the impacts on productivity considering the factors mentioned above.

For example, when a plurality of manufacturing apparatus are stopped together, it is very difficult to exactly find out a productivity deterioration considering various factors (priority, urgency, and so on).

SUMMARY OF THE INVENTION

It is an objective of the invention to provide a controlling method for a manufacturing process so as to effectively control the operating condition of the manufacturing process.

To achieve this object in one aspect, the invention comprises, in a controlling method for a manufacturing process, generating a Mahalanobis space of plural manufacturing control parameters, calculating a Mahalanobis distance from the Mahalanobis space, and making a decision that the manufacturing process is under a malfunction operating condition when the Mahalanobis distance is more than a threshold value.

According to the present invention, the operating condition of the manufacturing process can effectively be controlled with a high degree of accuracy.

The above and further objects and novel features of the invention will more fully appear from the following detailed description, appended claims and accompanying drawings.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is an explanatory diagram showing a group of data of manufacturing control parameters used in a control method for a manufacturing process according to the first preferred embodiment of the present invention;

FIG. 3 is an explanatory diagram showing a measured data group which is constructed with average value and standard deviation of sampled data and parameter;

FIG. 4 is an explanatory diagram showing a standardized data group of the measured data group shown in FIG. 3;

FIG. 5 is an explanatory diagram showing a correlation matrix R calculated in accordance with the standardized data group shown in FIG. 4;

FIG. 6 is an equation for calculating matrix elements of the correlation matrix R shown in FIG. 5;

FIG. 7 is an explanatory diagram showing an inverse matrix A of the correlation matrix R shown in FIG. 5;

FIG. 8 is an equation for calculating a Mahalanobis distance $D^2$;

FIG. 9 is an explanatory diagram showing ideal values $I_k$ of the manufacturing parameters, and maximum and minimum values of the ideal values (the maximum and minimum acceptable variations from the ideal values, $U_k$ and $L_k$);

FIG. 10 is an explanatory diagram showing a data group of range-limited random numbers;

FIG. 13 is an explanatory diagram showing a degree of incidence for the Mahalanobis distance $MD_j$ when the parameter data is $Y_1$ (k=1);

FIG. 14 is an explanatory diagram showing a degree of incidence for the Mahalanobis distance $MD_j$ when the parameter data is $Y_2$ (k=2);

FIG. 15 is an explanatory diagram showing a priority of the manufacturing process needing a recovery;

FIG. 16 is an explanatory diagram showing a relationship between a manufacturing apparatus and a process section from "Start" to "End" of a wafer process;

FIGS. 20(a) and 20(b) are WIP-IPW analyzer charts showing simultaneously a time, a WIP and a IPW.

DETAILED DESCRIPTION OF THE PREFERRED EMBODIMENTS

Preferred embodiments of the present invention will hereinafter be described in detail with reference to the accompanying drawings. The drawings used for this description typically illustrate major characteristic parts in order that the present invention will be easily understood.

Figure 1:
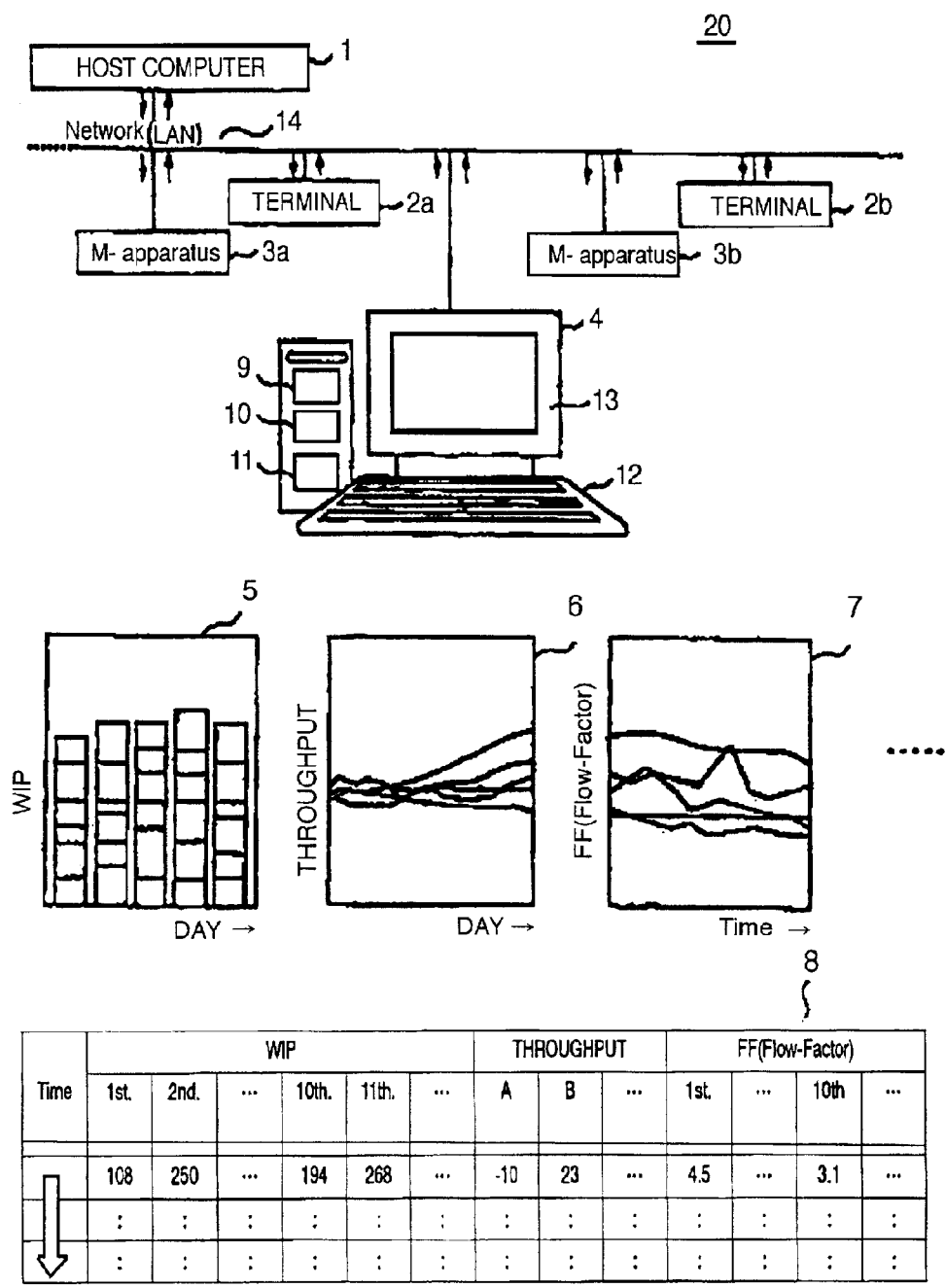
FIG. 1 is a block diagram showing a control system according to a first preferred embodiment of the present invention.

FIG. 1 is a block diagram showing a control system 20 according to a first preferred embodiment of the present invention. The control system 20 includes a host computer 1, a local area network (LAN) 14 and a fab-server 4 set in a fabricating laboratory. The host computer 1 performs as a data base (DB) storing various information. Such information is, for example work-in-progress (WIP) information and transport information which are inputted from plural terminals 2a and 2b, and apparatus information which is inputted from plural manufacturing apparatuses 3a and 3b. The fab-server 4 includes an arithmetic circuit 9, a memory 10, a comparator 11, and input and output devices 12 and 13. The control system 20 is connected to the host computer 1 by the LAN 14.

The fab-server 4 accesses a database of the host computer 1 and outputs various reports 8 relating to a change of area WIP, a change of section WIP, a change of process cumulative throughput, a change of area flow-factor (FF) and a change of section FF. Data relating to the WIP, the cumulative throughput and the FF, are outputted on the report 8. As shown in FIG. 1, a graph 5 indicating the change of WIP, a graph 6 indicating the change of cumulative throughput, and a graph 7 indicating the change of FF, are illustrated. The graph 5 shows relationships between the area WIP and time, and the section WIP and time. The graph 6 shows the relationship between the cumulative throughput of the sections and time. The graph 7 shows relationships between the area FF and time, and the section FF and time.

The present invention can determine whether the manufacturing process is in a normal operating condition or not, in accordance with at least one Mahalanobis space (a based space) which is generated on the basis of plural manufacturing control parameters shown on the graphs 5, 6 and 7, and the report 8.

Next, a control method for a manufacturing process will be described below.

FIG. 2 is an explanatory diagram showing a group data of manufacturing control parameters used in a control method for manufacturing process according to the first preferred embodiment of the present invention. Parameter data $Y_k$ consists of P data pointy values and n rows of data. Data located in the same row indicates the data pertain to the same time. The parameter data $Y_k$ is supplied from the host computer 1 by the fab-server 4 at constant time intervals. Such supplied parameter data $Y_k$ indicates a sampled data. The total number of sampled data is (P×n) data samples. The sampled data is denoted $y'_{i \cdot j}$.

The Mahalanobis space (base space) is generated before a Mahalanobis distance is calculated. In the first preferred embodiment, the sampled data parameter data $y'_{i \cdot j}$ is assumed to be a normal data.

FIG. 3 is an explanatory diagram showing a measured data group which is constructed with an average value and a standard deviation of the sampled data. FIG. 4 is an explanatory diagram showing a standardized data group of the measured data group shown in FIG. 3. The average value of n rows of parameter data $Y_k$, is denoted as $m_k$. The standard deviation is denoted as $\sigma_k$. The measured sampled data $(y'_{1 \cdot 1}, \ldots, y'_{k \cdot j}, \ldots, y'_{p \cdot n})$ is standardized by using a following equation (1).

$$Y_{k \cdot j} = (y'_{k \cdot j} - m_k) / \sigma_k \qquad (1)$$

FIG. 5 is an explanatory diagram showing a correlation matrix R calculated in accordance with the standardized data group shown in FIG. 4. FIG. 6 is an equation (2) for calculating matrix elements $r_{i \cdot j}$ of the correlation matrix R shown in FIG. 5. FIG. 7 is an explanatory diagram showing an inverse matrix A of the correlation matrix R shown in FIG. 5. FIG. 8 is an equation (3) for calculating a Mahalanobis distance $D^2$.

Matrix elements $r_{i \cdot j}$ and $r_{j \cdot i}$ (i, j=1 to P) of the correlation matrix R are calculated by using the equation (2). Specifically, matrix elements $r_{i \cdot j}$ and $r_{j \cdot i}$ (i, j=1 to P) of the correlation matrix R are functions of data $y_{i \cdot j}$ and $y_{j \cdot i}$ of the standardized data group. The inverse matrix A of the correlation matrix R is generated in accordance with the correlation matrix R. Therefore, a Mahalanobis space A (a base space A) is generated. All calculation for generating the Mahalanobis space A is performed by the arithmetic circuit 9 in the fab-server 4. Matrix elements $a_{i \cdot j}$ (i, j=1 to P) of the inverse matrix A which indicates the Mahalanobis space A, are stored to the memory 10 in the fab-server 4.

After the Mahalanobis space A is generated, the fab-server 4 samples the parameter data from the database of the host computer 1 at constant time intervals. The standardized data $y_1, \ldots, y_p$ are generated due to a standardization of the sampled data $y'_1, \ldots, y'_p$, by using the equation (1). Such a sampled data $y'_1, \ldots, y'_p$ and a standardized data $y_1, \ldots, y_p$ are always stored to the memory 10 in the fab-server 4, and can be always outputted as the graphs 5, 6 and 7, and the report 8.

Next, the Mahalanobis distance $D^2$ is generated by using the equation (3). The Mahalanobis distance $D^2$ is also stored to the memory 10 in the fab-server 4, and outputted with the graphs 5, 6 and 7, and the report 8. Reference signs $y_i$ and $y_j$ of the equation (3) are generated in accordance with the standardized data $y_1, \ldots, y_p$ of the sampled data $y'_1, \ldots, y'_p$. And, a reference sign $a_{i \cdot j}$ of the equation (3) denotes the matrix element of the Mahalanobis space A.

The Mahalanobis distance $D^2$ comes to be a value closer to 1 when there is higher similarity between with the standardized data $y_1, \ldots, y_p$ and the standardized data group $y_{1 \cdot 1}, \ldots, y_{p \cdot n}$ as the basis for generating the Mahalanobis space A. In other words, so long as the Mahalanobis space A is generated by a data group under normal operating conditions, the operating condition is closer to normal as the Mahalanobis distance $D^2$ is closer to 1. On the other hand, the operating condition deviates more from being normal as the Mahalanobis distance $D^2$ becomes more remote from 1.

Therefore, according to a judgement by the comparator 11 as to whether or not the Mahalanobis distance $D^2$ is larger than a threshold value, it is possible to determine whether or not the operating condition is normal. The threshold value can be selected according to strictness of control.

According to the first preferred embodiment of the present invention, whether the operating condition is normal or not can be judged in response to whether or not the Mahalanobis distance $D^2$ which is generated in accordance with the sampled data by sampling at constant time intervals is larger than the threshold value. Therefore, the operating condition of the manufacturing process can be effectively controlled.

In the first preferred embodiment, the Mahalanobis space A is generated on the basis of the sampled data under the normal operating condition. Next, in a second preferred embodiment, the Mahalanobis space A is generated on the basis of manufacturing parameters which are random numbers within a permissible range of ideal values. As a result, a degree of divergence for an ideal operating condition of the manufacturing process can be judged.

FIG. 9 is an explanation diagram showing ideal values $I_k$ of the manufacturing parameters, and maximum and minimum values of the ideal values (the maximum and minimum acceptable variations from the ideal values, $U_k$ and $L_k$). The ideal values $I_k$ and the range of the maximum and minimum values $U_k$ and $L_k$ are selected to correspond to a desired operating condition of the process, and fulfill a relationship $L_k \leq I_k \leq U_k$.

FIG. 10 is an explanatory diagram showing a data group of range-limited random numbers between the maximum and minimum values $U_k$ and $L_k$. The data form of the range-limited random numbers is the same as the manufacturing parameters shown in FIG. 2. Range-limited data $Y'_{kj}$ used as the Mahalanobis space A (the base space A) is a random number which fulfills a relationship $L_k \leq Y'_{kj} \leq U_k$. The controlling method for the manufacturing process according to the second preferred embodiment is the same as the first preferred embodiment, except the generating step of the Mahalanobis space A (the base space A) which is performed in accordance with the random number generating within a permissible range of the ideal value. Since the Mahalanobis space A of the second preferred embodiment is obtained on the basis of the random number generation within a permissible range of the ideal value, the Mahalanobis distance $D^2$ corresponds a degree of divergence from the Mahalanobis space A, the so-called, "ideal space A".

Figure 11:
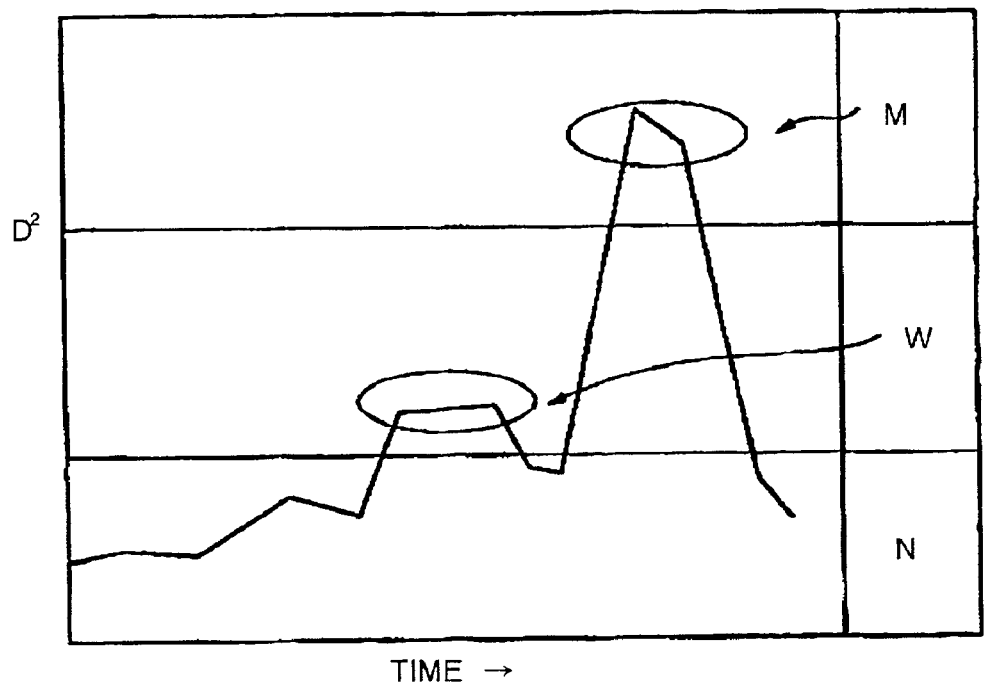
FIG. 11 is a graph showing changes in the Mahalanobis distance $D^2$ which indicates changes in the operating condition of the manufacturing process attendant to the passage of time.

FIG. 11 is a graph showing changes in the Mahalanobis distance $D^2$ which indicates changes in the operating condition of the manufacturing process attendant to the passage of time. As shown in FIG. 11, the graph is stratified into a malfunction operating condition range M, a warning operating condition range W and a normal operating condition range N. It is possible to determine that the operating condition is in the normal range N or the warning range W or the malfunction range M, so as to compare the generated Mahalanobis distance $D^2$ and a range of threshold values which is set on the basis of the ideal operating condition of the manufacturing process.

According to the second preferred embodiment of the present invention, since the Mahalanobis distance $D^2$ corresponds to a degree of divergence from the Mahalanobis space A (the ideal space A), it is possible to determine the degree of divergence from the ideal operating condition of the manufacturing process, using such a Mahalanobis distance $D^2$. Therefore, the operating condition of the manufacturing process can effectively be controlled.

Next, a third preferred embodiment of the present invention will be described bellow. It is characteristic of the third preferred embodiment to specify and extract a malfunction process step and a malfunction manufacturing apparatus, under the malfunction operating condition of the manufacturing process.

Figure 12:
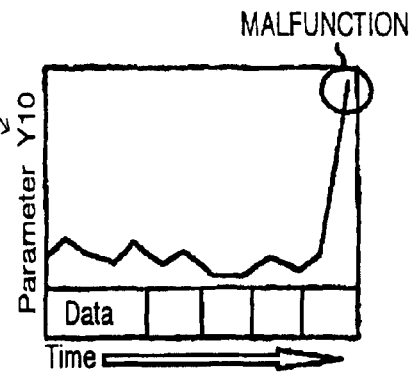
FIG. 12 is an explanatory diagram showing output samples of a standardized data B and an extracted malfunction parameter, and a graph of the extracted malfunction parameter.

FIG. 12 is an explanatory diagram showing output samples of a standardized data B and an extracted malfunction parameter, and a graph of the extracted malfunction parameter. The standardized data B is generated due to a standardization of the sampled data of manufacturing process $(y'_1, \ldots, y'_k, \ldots, y'_p)$, and stored in the memory of the control system 20. The larger the absolute value $|B|$ of the standardized data B, the greater the degree of divergence (the Mahalanobis distance $D^2$) from the Mahalanobis space A (the base space A). Similarly to the first and second embodiment, the Mahalanobis distance $D^2$ can be calculated on the basis of the sampled data of the manufacturing control parameter by sampling at constant time intervals.

Next, the Mahalanobis distance $D^2$ and a threshold value are compared. As a result, when the Mahalanobis distance $D^2$ is a malfunction value, the malfunction parameter data group which includes the malfunction process steps is extracted. After the Mahalanobis distance $D^2$ is generated, displacement quantities are calculated for each of the manufacturing parameters from the average of the standardized data B of the Mahalanobis space A (the base space A). A degree of incidence of a malfunction operating condition is determined for each process step. Data of the malfunction parameter data group are arranged according to the degree of incidence of malfunction in order. Such a malfunction parameter data group is shown in FIG. 12.

Next, standards for determining the degree of incidence of the standardized data B will be described below. As shown in the equation (1), the standardized data B is calculated, after subtracting an average value from a measured value $(y'_{k \cdot j} - m_k)$, by dividing it by a standard deviation $(\sigma_k)$. Therefore, when the absolute value $|B|$ of the standardized data B is "1", the degree of incidence of the standardized data B means 1 sigma dispersion. Similarly, when the absolute value $|B|$ of the standardized data B is "2" or "3", the degree of incidence of the standardized data B means 2 or 3 sigma dispersion, respectively.

In the third preferred embodiment, when the absolute value $|B|$ of the standardized data B is equal to or less than "1", the operating condition is judged as being normal. On the other hand, when the absolute value $|B|$ of the standardized data B is equal to or more than "2" or, perhaps, "3", the operating condition is judged as a malfunction condition. However, such a definition only consists of generating the Mahalanobis space A (the base space A) on the basis of the data group under the normal operating condition. If the Mahalanobis space A (the base space A) is generated on the basis of the ideal value of the manufacturing parameter, the degree of incidence is determined by comparing the standardized data B to the ideal values $I_k$.

As shown in FIG. 12, the malfunction parameter is outputted on the graph and report, by linking the malfunction parameter with the graph and report. The malfunction parameter is linked with the graph and report which are set relationships to various parameters.

According to the third preferred embodiment of the present invention, since such a malfunction process step and a malfunction manufacturing apparatus can be extracted promptly without a skilled administrator, a deterioration of the operating condition can be minimized. Therefore, the operating condition of the manufacturing process can effectively be controlled.

The Mahalanobis distance is generated considering a correlation between respective parameters. Therefore, it is desirable for a degree of incidence of the Mahalanobis distance to consider not only the degree of divergence from the respective parameters, but also a malfunction level of correlation between the respective parameters. When the operating condition is a malfunction, the Mahalanobis distance is larger than the normal operating condition. At this time, it is needed to find a parameter impacting such a malfunction Mahalanobis distance $Md_{ab}$. In a fourth preferred embodiment of the present invention, a method of calculating a degree of incidence of the Mahalanobis distance for each of the respective parameters, will be described. Specifically, a method of calculating the malfunction level of correlation between the respective parameters.

After the Mahalanobis distance (a first Mahalanobis distance) $D^2$ is generated by a calculating method which is mentioned above, n data points of the parameter data $Y_k$ are generated due to a combination qCn (n=1, 2, . . . ), when q manufacturing control parameters are used in the calculation, and the sampled data under the malfunction operating condition are $(y'_1, \ldots, y'_k, \ldots, y'_p)$. There are P combinations when n is 1 (n=1), and there are P×(P−1)/2 combinations when n is 2 (n=2), and so forth. The P×(P−1)/2 combinations are called the X combinations below.

For example, the average value $m_k$ and the ideal value $i_k$ of the Mahalanobis space A (the base space A) are calculated on the basis of 2-point parameter data $Y_k$ of the X combinations, when n is 2 (n=2). At this time, k are selected 2 values from 1 through P. Since the average value $m_k$ and the ideal value $i_k$ of the Mahalanobis space A (the base space A) are identical to those employed in the examples mentioned above, the description of them will therefore be omitted. Then, X-way Mahalanobis distance (second Mahalanobis distance) $MD_j$ are generated.

As a result, a combination having the largest degree of divergence between the X-way Mahalanobis distance $MD_j$ and the malfunction Mahalanobis distance $MD_{ab}$, is determined as a worst parameter aggravating the Mahalanobis distance. Specifically, the worst parameter aggravating the operating condition can be specified and extracted.

FIG. 13 is an explanatory diagram showing a degree of incidence for the Mahalanobis distance $MD_j$ when the parameter data is $Y_1$ (k=1). Assuming that the Mahalanobis distance $MD_j$ is aggravated due to the malfunction parameter data $Y_1$, the malfunction sampled data $y_1$ is defined as an average value $m_1$ of the Mahalanobis space A (the base space A). Then, the calculated Mahalanobis distance $MD_1$ is an extremely small value, however, since other parameter data $Y_2$ through $Y_P$ correspond to a normal condition, the calculated Mahalanobis distance $MD_2$ through $MD_P$ scarcely change. The degree of incidence for the Mahalanobis distance when the parameter data $Y_k$ is extracted for P combinations, can denote as a degree of divergence ($MD_{ab}$−$MD_j$) between the Mahalanobis distance $MD_j$ and the malfunction Mahalanobis distance $MD_{ab}$. A parameter having the largest degree of divergence ($MD_{ab}$−$MD_j$) between the Mahalanobis distances $MD_j$ and $MD_{ab}$, has the largest degree of incidence of the Mahalanobis distance.

FIG. 14 is an explanatory diagram showing a degree of incidence for the Mahalanobis distance $MD_j$ when the parameter data is $Y_2$ (k=2), specifically, showing the degree of incidence for the Mahalanobis distance when the parameter data $Y_k$ is extracted in X combinations. As a result, a change of the Mahalanobis distance in accordance with a malfunction between plural parameters having a correlation with each other can be specified and extracted so as to consider not only a change of one parameter but also changes of plural parameters.

FIG. 15 is an explanatory diagram showing a priority of the manufacturing process needing a recovery. The priority of the manufacturing process needing a recovery is generated on the basis of FIGS. 13 and 14, when all manufacturing process parameters have the same priority level. Though the description of detail may be omitted, it is possible to set an absolute priority of the manufacturing process parameter.

In the fourth preferred embodiment, the selected combination of parameters is extracted from plural parameters used to calculate the first Mahalanobis distance $D^2$, and then the average value $m_k$ and the ideal value $I_k$ of the Mahalanobis space A (the base space A) are generated on the basis of the selected combination of parameters, and finally, the second Mahalanobis distance $MD_j$ is generated.

According to the fourth preferred embodiment of the present invention, since the degree of divergence between the malfunction Mahalanobis distance MDab and the second Mahalanobis distance $MD_j$ is calculated, the worst parameter aggravating the operating condition can be specified and extracted in accordance with the degree of divergence.

Next, a fifth preferred embodiment of the present invention will be described below. FIG. 16 is an explanatory diagram showing a relationship between a manufacturing apparatus and a process section from "Start" to "End" of a wafer process. Since there are a large quantity and many different kinds of process flows in a manufacturing line, a common process within all process flows is selected if possible. If there is not a common process, the closest process to a common process is selected. Then, sections belonging to the manufacturing apparatuses are registered, respectively. At this time, apparatus information received from the database (DB) of the host computer 1, is registered into the memory 10 of the fab-server 4. Or, it is possible to register the apparatus information directly, from the input device of the fab-server 4.

Figure 17:
FIG. 17 is an explanatory diagram showing an output example of a risk level considering a degree of incidence of the manufacturing process.

FIG. 17 is an explanatory diagram showing an output example of a risk level considering a degree of incidence for the manufacturing process. In the fifth preferred embodiment, the risk level is classified into six levels, and determined in accordance with a risk point calculated on the basis of a minimum WIP, a WIP target and a weighting factor which is classified by the weight of the section. Such a risk point is generated by using a following equation (4).

Risk point=Weight×(WIP target−WIP actual)/(WIP target−WIP minimum)  (4)

Figure 18:
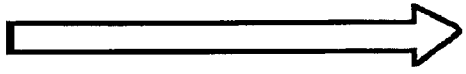
FIG. 18 is an explanatory diagram showing another output example of the risk level considering a degree of incidence of the manufacturing process.

FIG. 18 is an explanatory diagram showing another output example of the risk level considering a degree of incidence for the manufacturing process. FIG. 18 is considered about an In-process wafer (IPW) parameter of a section.

The IPW parameter indicates an amount of wafer lots in-process, and is recognized to show a throughput of the manufacturing apparatus. Similar to FIG. 17, the risk level is classified into six levels. And, the risk level is determined in accordance with a risk point calculated on the basis of a minimum IPW, an IPW target and a weighting factor which is classified by the weight of section. A calculation of such a risk point uses an equation similar to the equation (4) above.

The output examples of the risk level as shown in FIGS. 17 and 18, link with the individual manufacturing apparatuses. A network supplying information corresponding to the individual apparatus through an intranet can be constructed.

The manufacturing parameters, for example Work in progress (WIP), Diary going rate (DGR), Cycle-time (CT), Flow-factor (FF) and Raw process time (RPT), have various relationships with each other. Therefore, as shown in FIGS. 17 and 18 the order of task priority can be decided due to each of the various parameters (WIP, operating condition, weight of process step, and so on), or due to a selected combination of the various parameters.

According to the fifth preferred embodiment of the present invention, the risk level of the malfunction manufacturing apparatus can be determined in a timely manner, by comparing the data sampled at constant time intervals and a set value (ex. A minimum WIP, a WIP target, a weight of a section). As a result, since the priority of the manufacturing process needing the recovery and a recovery condition of the manufacturing can be determined in a timely manner, the operating condition of the manufacturing process can effectively be controlled.

Figure 19:
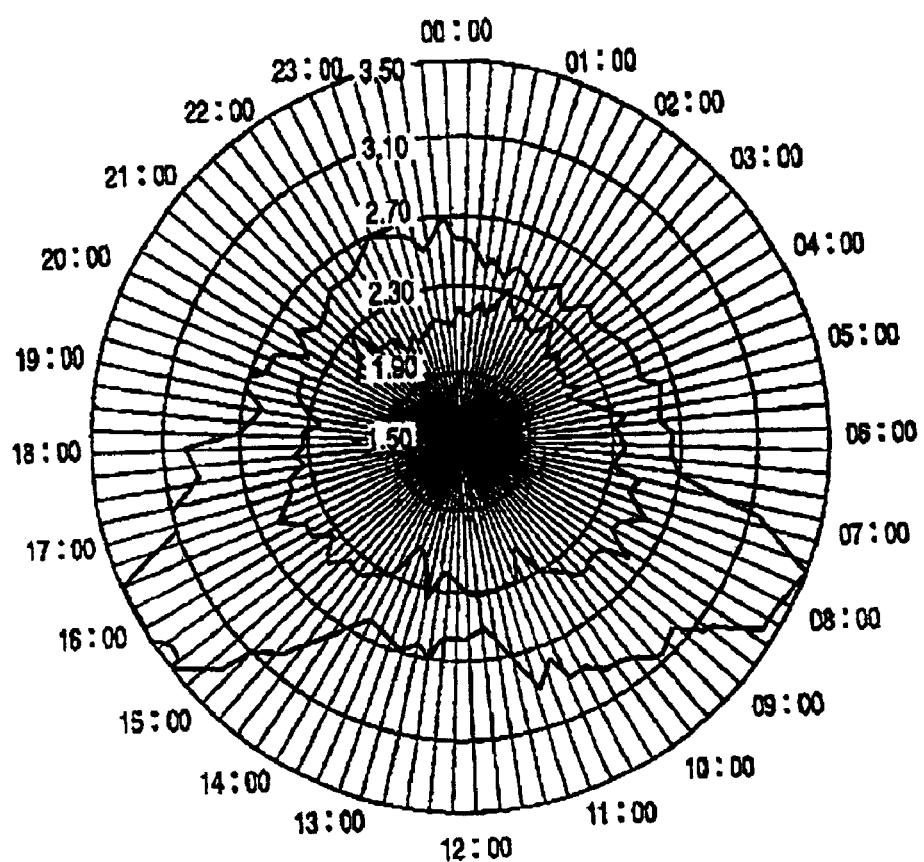
FIG. 19 is a "clock-like" FF analyzer chart showing a relationship between a time and the flow-factor (FF)

Next, a sixth preferred embodiment of the present invention will be described below. FIG. 19 is a "clock-like" FF analyzer chart showing a relationship between time and the flow-factor (FF). The FF is monitored at 15 minutes intervals. The watch type FF analyzer chart is outputted on the output device 13 of the fab-server 4. The FF is calculated by an equation (FF=WIP/IPW). The work in progress (WIP) and the in-process wafer (IPW) are able to be collected easily at a short interval from the database (DB) of the host computer 1. The WIP and the IPW are collected, for example for each of the following items (a section, an area, a process step, an apparatus). The FF are calculated for all those cases. In the sixth preferred embodiment, the IPW indicates a throughput of the apparatus for each of the following:

1) Each section.
2) Each group of n sections. (n is selected)
3) Each area. (ex. etching, photolithography, sputtering, etc.)
4) Each process step. (ex. active-etching, metal-spattering, etc.)
5) Each apparatus group. (ex. AAAA, KKKK, SSSS, etc.)
6) Each apparatus. (ex. AAAA01, KKKK09, SSSS05, etc.)

Generally, if the FF is smaller, the manufacturing speed is faster. However, when both of the WIP and the IPW decrease, the FF does not change. Therefore, it is very difficult to recognize that both of the WIP and the IPW decreased.

FIGS. 20(a) and 20(b) are WIP-IPW analyzer charts showing simultaneously a time, a WIP and a IPW. FIG. 20(a) is shown when the FF is a normal condition. FIG. 20(b) is when the FF is a malfunction condition. The malfunction condition (a halt condition) of the apparatus can be determined exactly, by outputting such a WIP-IPW analyzer chart on the output device of the fab-server 4.

According to the sixth preferred embodiment of the present invention, since the FF is calculated on the basis of the WIP and the IPW sampled at constant time intervals, and then it is timely outputted on the fab-server through the intranet (WEB), the operating condition of the apparatus and the process step can be determined quickly. Therefore, the operating condition of the manufacturing process can effectively be controlled.

Further, while the preferred embodiments of the present invention present an example in which is applied to a semiconductor manufacturing process, the present invention is not limited to this example and it may be applied to other various manufacturing process.

As described above, the controlling method for manufacturing process according to the present invention can determine whether the operating condition of the manufacturing process is normal or not, specify the malfunction control items and the malfunction apparatus, and determine exactly the priority of the manufacturing process needing recovery, and the risk level aggravating the manufacturing process. More further, since the inverse matrix of the correlation matrix of plural parameter data is generated, the operating condition of the manufacturing process can be controlled taking into consideration a correlation between plural parameter data. Therefore, the operating condition of the manufacturing process can effectively be controlled with a high degree of accuracy.

The present invention has been described with reference to illustrative embodiments, however, this invention must not be considered to be confined only to the embodiments illustrated. Various modifications and changes of these illustrative embodiments and the other embodiments of the present invention will become apparent to those skilled in the art with reference to the description of the present invention. It is therefore contemplated that the appended claims will cover any such modifications or embodiments as fall within the true scope of the invention.

What is claimed is:

1. A method of controlling a manufacturing process, comprising:

providing first sampled data which indicates a sampled data group by sampling a plurality of manufacturing control parameters under a normal operating condition of the manufacturing process, which includes a plurality of process steps;

generating a Mahalanobis space of the plurality of the manufacturing control parameters, based first sampled data;

providing second sampled data which indicates a sampled data group by sampling the plurality of manufacturing control parameters at constant time intervals, during the manufacturing process;

calculating a Mahalanobis distance from the Mahalanobis space and the second sampled data;

making a decision that the manufacturing process is under a malfunction operating condition when the Mahalanobis distance is more than a threshold value;

calculating displacement quantities for each of the manufacturing control parameters from an average of the Mahalanobis space; and determining a degree of incidence of the malfunction operating condition for each of the plurality of process steps, in accordance with the displacement quantities for each of the manufacturing control parameters.

2. The method according to claim 1, wherein the Mahalanobis space is generated in accordance with an inverse matrix of a correlation matrix of the first sampled data.

3. The method according to claim 1, further comprises:
storing information provided by a control method for the manufacturing process, into a host computer through a local area network, wherein the information is accessible from a plurality of servers through an intranet.

4. A method of controlling a manufacturing process, comprising:
setting ideal data of plural manufacturing control parameters of the manufacturing process which includes a plurality of process steps, and a permissible range of the ideal data;
generating random numbers within the permissible range of the ideal data;
generating Mahalanobis spaces for each of the plural manufacturing control parameters, based on the random numbers;
providing sampled data which indicates a sampled data group by sampling the plural manufacturing control parameters at constant time intervals, during the manufacturing process;
calculating Mahalanobis distances from the Mahalanobis spaces and the sampled data;
determining a degree of divergence from an ideal operating condition of the manufacturing process, by comparing the Mahalanobis distances and a threshold value;
calculating displacement quantities for each of the manufacturing control parameters from an average of the Mahalanobis spaces; and
determining a degree of incidence of a malfunction operating condition for each of the plurality of process steps, in accordance with the displacement quantities for each of the manufacturing control parameters.

5. A method of controlling a manufacturing process, comprising:
providing first sampled data which indicates a sampled data group by sampling a plurality of manufacturing control parameters under a normal operating condition of the manufacturing process, which includes a plurality of process steps;
generating a Mahalanobis space of the plurality of the manufacturing control parameters, on the basis of the first sampled data;
providing second sampled data which indicates a sampled data group by sampling the plurality of manufacturing control parameters during the manufacturing process, at constant time intervals;
calculating a first Mahalanobis distance from the Mahalanobis space and the second sampled data;
generating a selected group of combined parameters the plurality of the manufacturing control parameters;
calculating a second Mahalanobis distance from the Mahalanobis space and the selected group of combined parameters; and
determining a degree of incidence of a malfunction operating condition for each of the plurality of process steps, in accordance with a displacement quantity of the second Mahalanobis distance from the first Mahalanobis distance.

6. The method according to claim 5, further comprising:
storing information provided by a control method for the manufacturing process, into a host computer through a local area network, wherein the information is accessible from a plurality of servers through an intranet.

7. A method of controlling a manufacturing process, comprising:
setting ideal data of plural manufacturing control parameters of the manufacturing process which includes a plurality of process steps, and a permissible range of the ideal data;
generating random numbers within the permissible range of the ideal data;
generating Mahalanobis spaces for each of the plural manufacturing control parameters, based on the random numbers;
providing sampled data which indicates a sampled data group by sampling the plural manufacturing control parameters at constant time intervals, during the manufacturing process;
calculating Mahalanobis distances from the Mahalanobis spaces and the sampled data;
determining a degree of divergence from an ideal operating condition of the manufacturing process, by comparing the Mahalanobis distances and a threshold value; and
storing information provided by a control method for the manufacturing process, into a host computer through a local area network, wherein the information is accessible from a plurality of servers through an intranet.

8. A method of controlling a manufacturing process, comprising:
setting ideal data of plural manufacturing control parameters of the manufacturing process which includes a plurality of process steps, and a permissible range of the ideal data;
generating random numbers within the permissible range of the ideal data;
generating Mahalanobis spaces for each of the plural manufacturing control parameters, based on the random numbers;
providing sampled data which indicates a sampled data group by sampling the plural manufacturing control parameters at constant time intervals, during the manufacturing process;
calculating Mahalanobis distances from the Mahalanobis spaces and the sampled data; and
determining a degree of divergence from an ideal operating condition of the manufacturing process, by comparing the Mahalanobis distances and a threshold value,
wherein the Mahalanobis spaces are generated in accordance with an inverse matrix of a correlation matrix of the sampled data.

9. A method of controlling a manufacturing process, comprising:
setting ideal data of plural manufacturing control parameters of the manufacturing process which includes a plurality of process steps, and a permissible range of the ideal data;
generating random numbers within the permissible range of the ideal data;
generating Mahalanobis spaces for each of the plural manufacturing control parameters, based on the random numbers;
providing sampled data which indicates a sampled data group by sampling the plural manufacturing control parameters at constant time intervals, during the manufacturing process;

calculating first Mahalanobis distances from the Mahalanobis spaces and the sampled data;
generating a selected group of combined parameters from the plural manufacturing control parameters;
calculating second Mahalanobis distances from the Mahalanobis spaces and the selected group of combined parameters; and
determining a degree of incidence of an ideal operating condition for each of the plurality of process steps, in accordance with a degree of divergence between the first and second Mahalanobis distances.

10. The method according to claim 9, further comprising:
storing information provided by a control method for the manufacturing process, into a host computer through a local area network, wherein the information is accessible from a plurality of servers through an intranet.

* * * * *